US012723714B2

(12) United States Patent
Ghiotto

(10) Patent No.: US 12,723,714 B2
(45) Date of Patent: *Sep. 1, 2026

(54) NITROX-MIXTURES PRODUCTION MACHINE

(71) Applicant: Nardi Compressori S.R.L., Montecchio Maggiore (IT)

(72) Inventor: Marco Ghiotto, Montecchio Maggiore (IT)

(73) Assignee: Nardi Compressori S.R.L., Montecchio Maggiore (IT)

( * ) Notice: Subject to any disclaimer, the term of this patent is extended or adjusted under 35 U.S.C. 154(b) by 0 days.

This patent is subject to a terminal disclaimer.

(21) Appl. No.: 18/605,883

(22) Filed: Mar. 15, 2024

(65) Prior Publication Data

US 2024/0309997 A1 Sep. 19, 2024

(30) Foreign Application Priority Data

Mar. 16, 2023 (IT) ........................ 102023000005010
Oct. 24, 2023 (IT) ........................ 102023000022266

(51) Int. Cl.
*F17C 5/06* (2006.01)
*F17C 5/00* (2006.01)

(52) U.S. Cl.
CPC ................ *F17C 5/007* (2013.01); *F17C 5/06* (2013.01); *F17C 2221/031* (2013.01); (Continued)

(58) Field of Classification Search
CPC ...... F17C 5/007; F17C 5/06; F17C 2221/031; F17C 2227/0157; F17C 2227/048; (Continued)

(56) References Cited

U.S. PATENT DOCUMENTS 4,860,803 A * 8/1989 Wells ........................ F17C 5/06 128/204.22
4,877,056 A 10/1989 Comte et al.
(Continued)

FOREIGN PATENT DOCUMENTS

DE 102010003507 A1 * 10/2011 ............ B01D 53/22
DE 102014108874 12/2015
(Continued)

OTHER PUBLICATIONS

WO-2022029888-A1 English Translation of Specification (Year: 2025).*

(Continued)

*Primary Examiner* — Kenneth Rinehart
*Assistant Examiner* — Stephanie A Shrieves

(57) ABSTRACT

A nitrox mixtures production machine that includes a molecular separator, which is configured to receive at an inlet a flow of air and to provide at an outlet an intermediate Nitrox mixture with high oxygen percentage. The nitrox mixtures production machine further includes a low pressure compressor, which is adapted to feed an air flow at the at least one inlet, a mixing manifold configured that provides at the outlet with predefined composition, oxygen sensor(s), and an electronic control device adapted to regulate the flow rate of the air flow that the low pressure compressor feeds at the at least one inlet based on signals coming from the oxygen sensor(s).

13 Claims, 3 Drawing Sheets

(52) U.S. Cl.
CPC ................. *F17C 2227/0157* (2013.01); *F17C 2227/048* (2013.01); *F17C 2250/032* (2013.01); *F17C 2250/043* (2013.01); *F17C 2250/0452* (2013.01); *F17C 2250/0636* (2013.01); *F17C 2265/015* (2013.01); *F17C 2270/025* (2013.01); *F17C 2270/0781* (2013.01)

(58) Field of Classification Search
CPC .......... F17C 2250/032; F17C 2250/043; F17C 2250/0452; F17C 2250/0636; F17C 2265/015; F17C 2270/025; F17C 2270/0781; B01D 2053/224; B01D 2256/12; B01D 2257/102; B01D 2311/0103; B01D 2313/24; B01D 2313/903; B01D 53/22; B01D 63/02; C01B 21/04
USPC ............................................................ 141/44
See application file for complete search history.

(56) References Cited

U.S. PATENT DOCUMENTS 5,053,058 A 10/1991 Mitariten
5,651,358 A 7/1997 Briend et al.
5,846,291 A * 12/1998 Delp, II ................ B63C 11/202 95/47
5,989,312 A 11/1999 Barnhard et al.
5,992,464 A * 11/1999 Cowell ................... B01F 33/82 137/892
6,395,065 B1 * 5/2002 Murdoch ............. B01D 53/053 96/113
6,792,846 B2 * 9/2004 Barrett .................... F04B 25/00 92/169.1
6,827,084 B2 12/2004 Grubb, Jr.
11,009,186 B2 * 5/2021 Sung ...................... A62B 27/00
2003/0234019 A1 12/2003 Grubb, Jr.
2005/0066814 A1 * 3/2005 Huebner ............. C01B 13/0251 96/4
2006/0230929 A1 * 10/2006 Bliss .................. B01D 53/0407 95/96
2011/0300493 A1 * 12/2011 Mittricker ................. F23C 9/00 431/89
2015/0336046 A1 * 11/2015 Ungerank .............. C12M 47/18 96/7
2018/0094628 A1 * 4/2018 Ghiotto ................... F04B 49/06
2021/0228254 A1 * 7/2021 Mayer .................... A61B 18/02

FOREIGN PATENT DOCUMENTS

EP 0851331 7/1998
FR 2722425 1/1996
WO WO-2022029888 A1 * 2/2022 ............. B01D 53/22

OTHER PUBLICATIONS

DE 102010003507 A1 English Translation of Specification (Year: 2025).*

Rapporto di Ricerca e l'Opinione Scritta [Search Report and Written Opinion] Dated Apr. 19, 2024 From the Ministero Delle Imprese e Del Made in Italy, Direzione Generale Sviluppo Produttivo e Competitivita, Ufficio Italiano Brevetti e Marchi Re. Application No. IT202300022266. (8 Pages).

Rapporto di Ricerca e Opinione Scritta [Search Report and Written Opinion] Dated Sep. 29, 2023 From the Ministero delle Imprese e del Made in Italy, Direzione Generale Sviluppo Produttivo e Competitivita, Ufficio Italiano Brevetti e Marchi Re. Application No. IT202300005010. (5 Pages).

European Search Report and the European Search Opinion Dated Jun. 19, 2024 From the European Patent Office Re. Application No. 24163490.6. (7 Pages).

Official Action Dated Oct. 21, 2025 from the US Patent and Trademark Office Re. U.S. Appl. No. 18/605,885. (42 Pages).

Ex Parte Quayle Official Action Dated Apr. 29, 2026 From the US Patent and Trademark Office Re. U.S. Appl. No. 18/605,885. (20 Pages).

* cited by examiner

NITROX-MIXTURES PRODUCTION MACHINE

CROSS-REFERENCE TO RELATED APPLICATIONS

This application claims the benefit of priority of Italian Patent Application Nos. 102023000005010 filed on Mar. 16, 2023 and 102023000022266 filed on Oct. 24, 2023, the contents of which are incorporated by reference as if fully set forth herein in their entirety.

FIELD AND BACKGROUND OF THE INVENTION

The present invention relates to a Nitrox-mixtures production machine.

More specifically, the present invention relates to machine for producing breathing gaseous Nitrox mixtures to be fed into a high-pressure compressor for refilling diving cylinders.

Use to which the following disclosure will make explicit reference without thereby losing in generality.

As is well known, scuba diving cylinders are hermetically sealed vessels, substantially cylindrical in shape, that have a nominal capacity of generally less than 18-20 litres and are structured to contain breathing air with a nominal maximum pressure usually ranging between 200 and 300 bar.

Scuba diving cylinders are usually filled using special high-pressure compressors, which are structured so as to suck air at ambient pressure and to deliver a flow of suitably filtered and dehumidified air at the outlet, with a nominal pressure of more than 200-300 bar.

Clearly, scuba diving cylinders may also be filled with breathing mixtures other than simple air. More and more often, in fact, divers choose to breath gaseous mixtures in which the stoichiometric ratios between oxygen, nitrogen and any other gases are totally different from those typical of common breathing air.

Nitrox breathing mixtures, for example, differ from conventional air in that they contain a higher percentage of oxygen. In other words, Nitrox mixtures are binary gaseous mixtures consisting of Nitrogen and Oxygen, in which the percentage of Oxygen is more than 21%.

Among the best-known and most popular gaseous mixtures among divers there are the breathing Nitrox mixtures in which the oxygen content is equal to 32% or 36%. These particular breathing mixtures are called EAN-32 and EAN-36, where the suffix EAN stands for Enriched Air Nitrox.

Over the past few years, the use of EAN-32 and EAN-36 mixtures has grown intensely, thus there has been developed machines that are capable of producing, at relatively low costs, large amounts of Nitrox mixtures with an oxygen percentage of 32% and/or 36%, and are adapted to be placed upstream of conventional high-pressure compressors for refilling diving cylinders.

In other words, these machines are capable of feeding the EAN-32 or EAN-36 mixtures directly to the suction of the high-pressure compressor.

Currently, the most popular Nitrox-mixtures production machines on the market use a semi-permeable membrane molecular separator, which is capable to separate nitrogen from oxygen by exploiting the fact that nitrogen molecules are larger than oxygen molecules.

In more detail, the molecular separator consists of an oblong-shaped pressure vessel, which has one inlet and two separate outlets, and moreover accommodates within itself a bundle of very thin hollow fibres made of polymeric material, which forms the semi-permeable membrane.

The inlet of the pressure vessel is used to introduce, into the molecular separator, a flow of air with a pressure of approximately 8-10 bar, which is channelled directly into the various hollow fibres forming the semi-permeable membrane. Inside the hollow fibres, most of the molecules of oxygen, carbon dioxide and water vapour contained in the air flow are able to freely pass through the wall of the hollow fibre, and head towards the first outlet of the pressure vessel. Most of the nitrogen molecules contained in the air stream, on the other hand, remain confined within the hollow fibres and head towards the second outlet of the pressure vessel.

From the first outlet of the molecular separator, therefore, a gaseous mixture with a high percentage of oxygen and water vapour comes out. From the second outlet of the molecular separator, on the other hand, a gaseous mixture with a nitrogen percentage of more than 90 percent comes out.

Unfortunately, the currently known semi-permeable membrane molecular separators have a limited efficiency, so that from the first outlet of the molecular separator, it comes out a gaseous mixture ture with an oxygen percentage of usually ranging between 40% and 42%, to which is added a significant percentage of water vapour.

In addition to the molecular separator with a semi-permeable hollow-fibre membrane, the above mentioned Nitrox-mixtures production machines additionally include: a low-pressure compressor that feeds a flow of air with a pressure of 8-10 bar into the molecular separator; and an electric heater, which is placed between the low-pressure compressor and the molecular separator, and is adapted to heat up the flow of pressurised air directed towards the molecular separator in order to maximise the efficiency of the latter.

Since the Nitrox mixture coming out of the molecular separator has an oxygen percentage higher than that required for EAN-32 and EAN-36 mixtures, the Nitrox-mixtures production machines are additionally provided with a tubular mixing manifold, which is connected to the suction of the high-pressure compressor and is adapted to mix the gaseous mixture with a high oxygen content coming from the molecular separator with fresh air coming from the outside, so as to lower to the desired value the oxygen percentage of the Nitrox mixture directed towards the suction of the high-pressure compressor.

More specifically, the tubular mixing manifold is provided with an air inlet, which communicates directly with the outside through the interposition of an air filter and thus allows air to enter the tubular mixing manifold; with a Nitrox inlet, which communicates directly with the first outlet of the molecular separator so as to allow the gaseous mixture with a high oxygen content produced by the molecular separator to enter into the tubular mixing manifold; and with a Nitrox outlet, from which a Nitrox mixture with a lower oxygen content than that of the gaseous mixture produced by the molecular separator comes out.

The Nitrox outlet of the tubular mixing manifold is adapted to be connected directly to the suction of the high-pressure compressor.

Finally, Nitrox mixture production machines are provided with an oxygen sensor, which is located at the Nitrox outlet of the tubular mixing manifold and measures the percentage of oxygen present in the Nitrox mixture directed towards the suction mouth of the high-pressure compressor; and a small display which is connected to the oxygen sensor and is able to show, in real time, the reading of the oxygen sensor.

Since the flowrate of the Nitrox mixture leaving the molecular separator is a fraction of the flowrate of the air fed into the same molecular separator, the oxygen percentage of the Nitrox mixture sucked in by the high-pressure compressor can be adjusted by appropriately varying the flowrate of the air flow that the low-pressure compressor feeds into the molecular separator.

In today's most efficient and performing Nitrox-mixtures production machines, the air is fed at inlet of the molecular separator via an electrically-driven volumetric screw compressor.

The flowrate delivered by the volumetric compressor is moreover regulated by a pressure-operated throttling valve, which is located at the suction mouth of the volumetric compressor, and is connected to the discharge of the same volumetric compressor via the interposition of a manually-operated pressure reducer, which is capable of varying the value of the air pressure returning to the throttling valve. By controlling the value of the air pressure arriving at the throttling valve, the pressure reducer is capable of varying the position of the shutter of the throttling valve and, thus, the flowrate of the compressor.

The person supervising the operation of the scuba-diving cylinders refilling equipment can therefore regulate the flowrate of air entering the molecular separator by manually acting on the pressure reducer.

Clearly, in order to maintain the oxygen percentage of the Nitrox mixture entering the high-pressure compressor at the desired value, the person supervising the operation of the scuba-diving cylinders refilling equipment must continuously check the values displayed by the display device and, when there are deviations from the desired value, correct the flowrate of the volumetric compressor by promptly acting on the pressure reducer of the volumetric compressor.

Since an incorrect composition of the Nitrox mixture can pose serious risks to the diver's safety, the Nitrox-mixtures production machines described above require the continuous presence of a person who monitors and promptly remedies the continuous variations of the oxygen percentage in the Nitrox mixture entering the high-pressure compressor.

In addition to the problem of continuous surveillance, unfortunately the above-described Nitrox-mixtures production machines moreover have a very unstable behaviour during transient states and takes a long time to stabilise, with all the problems this entails.

Nitrox mixture that does not meet the diver's requirements (wrong oxygen percentage) cannot be sent to the suction of the high-pressure compressor at all and must be discharged externally.

SUMMARY OF THE INVENTION

Aim of the present invention is to realise a Nitrox-mixtures production machine that can remedy the drawbacks described above without a significant increase in production costs.

In accordance with these aims, according to the present invention there is provided a Nitrox-mixtures production machine as defined in claim 1 and preferably, though not necessarily, in any of the claims dependent thereon.

Moreover, according to the present invention, there is provided a scuba diving cylinders refilling equipment as defined in the claims.

BRIEF DESCRIPTION OF THE SEVERAL VIEWS OF THE DRAWING(S)

The present invention will now be described with reference to the accompanying drawings, which show a non-limiting embodiment thereof, wherein:

FIG. 2 is a schematic view of the Nitrox-mixtures production machine shown in FIG. 1; whereas

DESCRIPTION OF SPECIFIC EMBODIMENTS OF THE INVENTION

Figure 1:
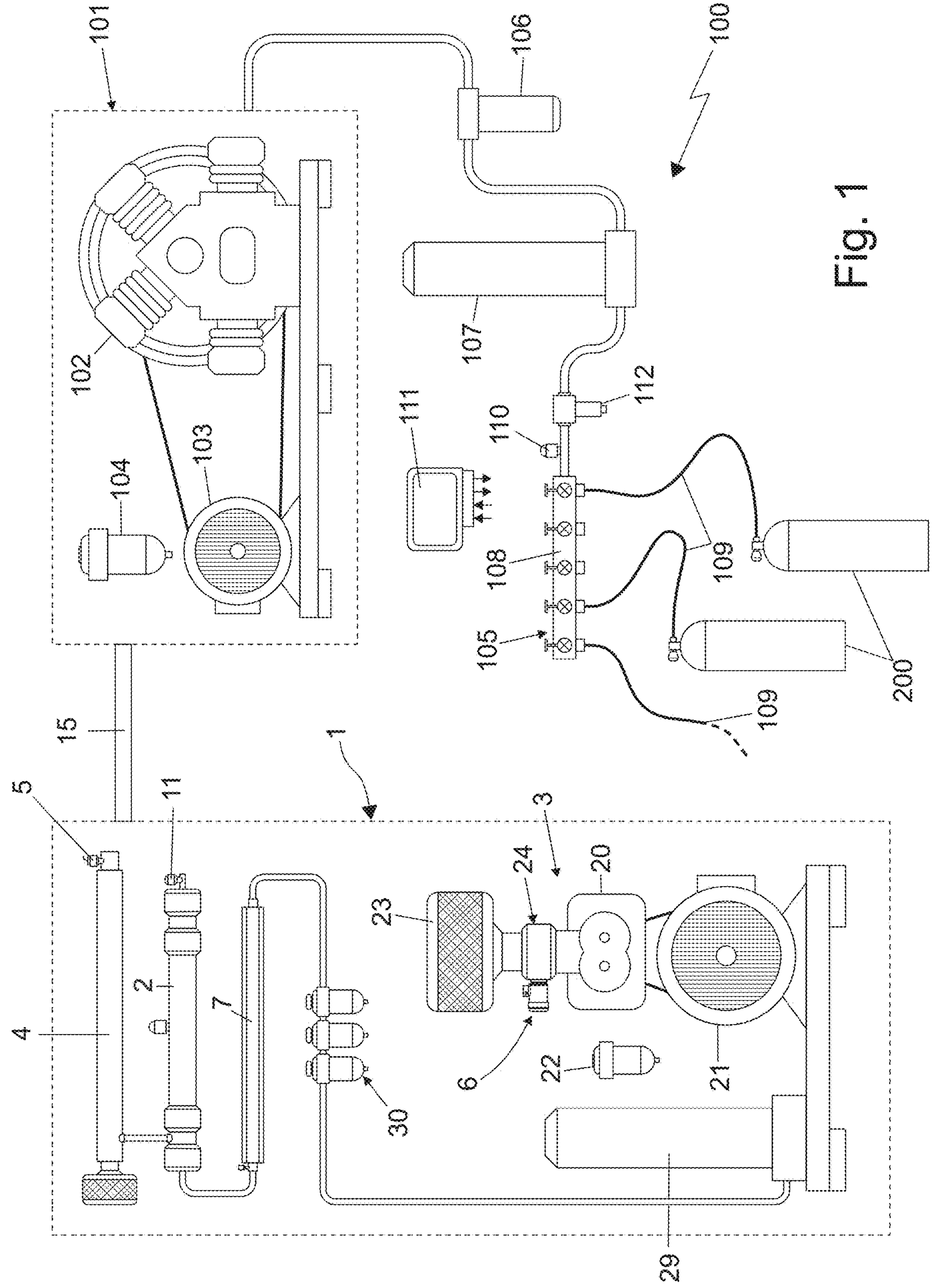
FIG. 1 illustrates, schematically and with parts removed for clarity's sake, a scuba diving cylinder filling equipment equipped with a Nitrox-mixtures production machine realized according to the teachings of the present invention.

With reference to FIG. 1, number 1 denotes as a whole a Nitrox-mixtures production machine, which is capable of delivering a breathing gaseous mixture consisting mainly of oxygen and nitrogen, in which the oxygen percentage is greater than 21% and advantageously also less than 50%.

More specifically, the machine 1 is adapted to deliver a substantially binary nitrogen-oxygen gaseous mixture, in which the oxygen percentage is preferably less than 40% and advantageously equal to 32% or 36%.

The machine 1, in addition, is preferably adapted to be used in or incorporated into a scuba-diving cylinder refilling equipment 100, which is structured so as to fill up one or more scuba-diving cylinders 200 with a breathing gaseous mixture with a pressure preferably higher than 150 bar and advantageously also higher than 200 bar.

Scuba diving cylinders 200 are pressure vessels substantially cylindrical in shape, known and readily available on the market, so their structure won't be further described.

With reference to FIG. 1, on the other hand the scuba-diving cylinders refilling equipment 100 comprises at least one high-pressure compressor 101, which is specifically structured/dimensioned for sucking in air or any other gaseous mixture at ambient pressure, and for delivering at outlet a flow of high-pressure air or other gaseous mixture with a supply/delivery pressure preferably greater than 150 bar and advantageously also equal to or greater than 200 bar.

Preferably the high-pressure 101 compressor is moreover a positive displacement compressor.

The Nitrox-mixtures production machine 1, in turn, is preferably adapted to be placed upstream of the high-pressure compressor 101, so as to be able to feed, at inlet of the same high-pressure compressor 101, a Nitrox mixture with a predetermined composition.

In other words, the machine 1 is structured so as to be connected to the suction mouth of the high-pressure compressor 101, and is adapted to feed at inlet of the high-pressure compressor 101 a Nitrox gaseous mixture with a predetermined percentage of Oxygen and, consequently, of Nitrogen.

With reference to FIG. 1, in the example shown, the high-pressure compressor 101 is preferably a positive displacement reciprocating compressor with a multi-stage structure.

More in detail, the high-pressure compressor 101 preferably comprises: a piston pumping assembly 102 with a multistage structure, which has a series of variable-volume pumping chambers connected in cascade one after the other; an electric driving motor 103, which is mechanically coupled to the pumping assembly 102 so as to continuously cyclically vary the volume of the various variable-volume chambers; and preferably also a gas/liquid separator 104, which is located downstream of the piston pumping assembly 102 and is structured so as to retain within itself the droplets of oil and/or condensed water vapour present in the flow of high-pressure air or other gaseous mixture coming out of the pumping assembly 102.

Preferably the delivery of the high-pressure compressor 101 is therefore located downstream of the gas/liquid separator 104.

In addition, the pumping assembly 102 and the drive motor 103 are preferably arranged side by side to one another, advantageously resting on the same supporting platform or frame, so as to form an easily transportable single block. Also the gas/liquid separator 104 is preferably located on the same supporting platform or frame.

Preferably, the pumping assembly 102 and the drive motor 103 are moreover connected to each other by means of a drive belt, which is looped around two pulleys fixed one on the shaft of drive motor 103 and the other on the crankshaft of the pumping assembly 102.

Clearly, the drive motor 103 may be also an internal combustion engine.

Preferably, the high-pressure compressor 101 is moreover provided with a series of heat exchangers (not illustrated), which are located downstream of the various variable-volume chambers of the pumping assembly 102, and are structured so as to cool down the air or other gaseous mixture flowing from a corresponding variable-volume chamber to the next and/or leaving the pumping assembly 102.

With reference to FIG. 1, preferably the scuba-diving cylinders refilling equipment 100 furthermore comprises: a high-pressure gas distribution assembly 105, which communi-cates with the delivery of the high-pressure compressor 101 so to receive at inlet the flow of high-pressure air or other gaseous mixture produced by the high-pressure compressor 101, and is selectively connectable to one or more scuba diving cylinders 200 so as to be able to channel said flow of high-pressure air or other gaseous mixture to said cylinder(s) 200; and a filtering assembly 106 preferably of the activated carbon type, which is located between the distribution assembly 105 and the delivery mouth of the high-pressure compressor 101, and more in detail between the gas/liquid separator 104 and the distribution assembly 105, and is structured so as to retain impurities and other physical and/or biological contaminants present in the flow of high-pressure air or other gaseous mixture flowing towards the distribution assembly 105.

Preferably, the scuba diving cylinders refilling equipment 100 moreover comprises a drying device 107 which is capable of retaining at least part of the water vapour present in the flow of high-pressure air or other gaseous mixture that flows towards the distribution assembly 105.

In the example shown, in particular, the drying device 107 is preferably an absorption dryer structured so as to reduce the amount of water vapour in the air leaving the high-pressure compressor 101 to a value less than or equal to 15 $mg/m^3$.

In addition, the distribution assembly 105 and/or the filtering assembly 106 and/or the dryer device 107 is/are preferably also located/fixed on the supporting platform or frame that supports the pumping assembly 102 and the drive motor 103.

Preferably, the high-pressure gas distribution assembly 105 in turn comprises: a distribution manifold 108, which communicates with the delivery of the high-pressure compressor 101 so as to receive the flow of high-pressure air or other gaseous mixture produced by the high-pressure compressor 101, and is provided with one or more manually-operated shut-off valves, separate and independent from each other, each of which is capable of regulating/controlling the exit of the high-pressure air or other gaseous mixture from the same manifold 108; and advantageously also one or more flexible connecting hoses 109, each of which is connected to the distribution manifold 108 so as to communicate with a single, respective shut-off valve of the distribution manifold 108, and is provided with a coupling connector specifically structured to be removably coupled to the valve of any scuba diving cylinder 200.

Preferably, the scuba-diving cylinders refilling equipment 100 moreover comprises: a pressure sensor 110, which is located immediately upstream of the distribution assembly 105, or rather upstream of the distribution manifold 108, and is structured to provide as output an electrical signal indicative of the pressure value of the high-pressure air or other gaseous mixture arriving in the distribution assembly 105; and an electronic control unit 111, which is connected to the pressure sensor 110 and is programmed/configured to switch off the high-pressure compressor 101, or rather switch off the drive motor 103, when the pressure value of the high-pressure air or other gaseous mixture arriving in the distribution assembly 105 reaches or exceeds a given limit value advantageously comprised between 200 and 300 bar.

Preferably, the scuba-diving cylinders refilling equipment 100 is finally also equipped with a normally-closed discharge valve 112, which is located immediately upstream of the distribution assembly 105, and more in detail between the dryer device 107 and the distribution assembly 105, and is structured so as to selectively divert/discharge directly outside the flow of high-pressure air or other gaseous mixture arriving from the high-pressure compressor 101, before it may reach the high-pressure gas distribution assembly 105.

Figure 2:
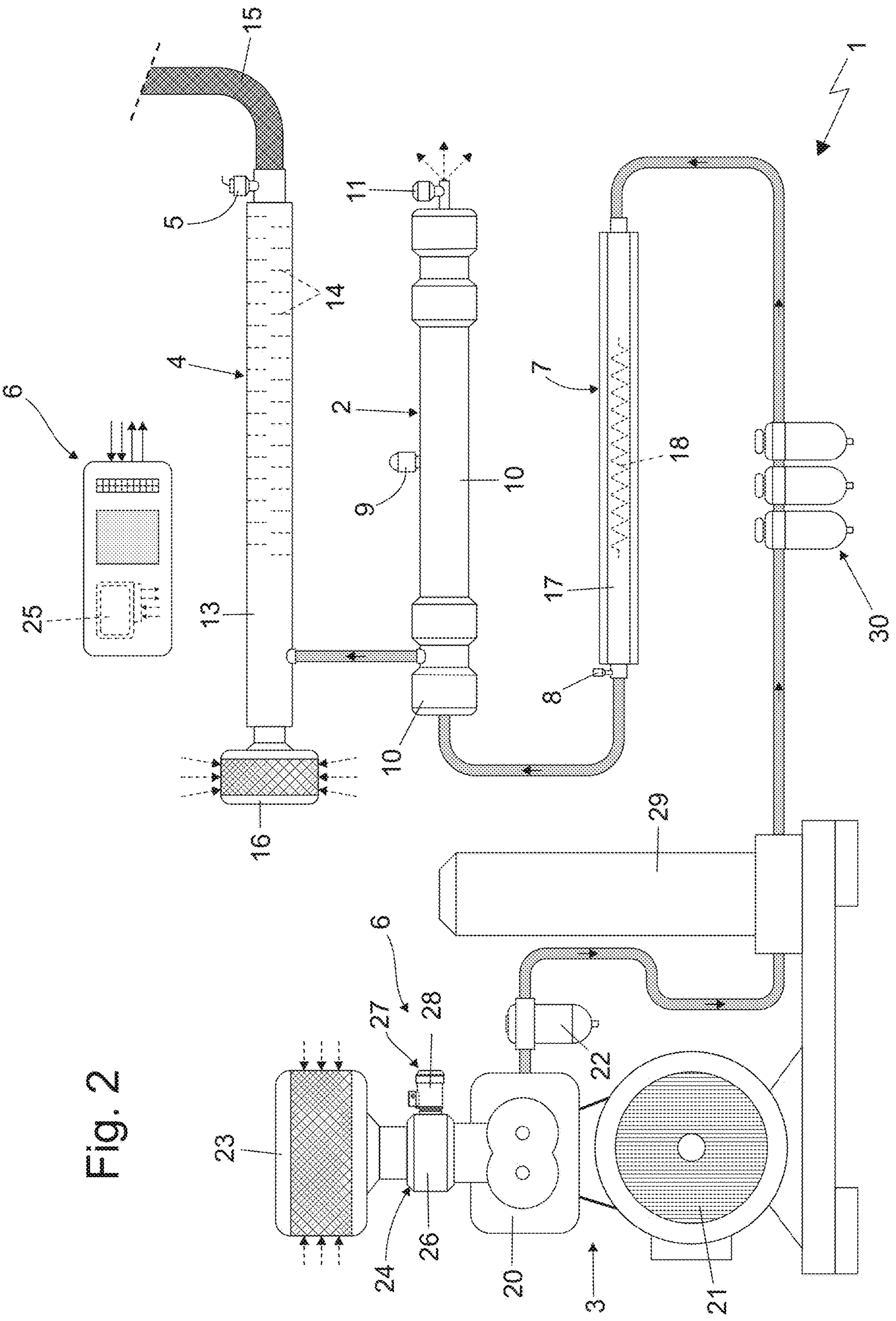

With reference to FIGS. 1 and 2, the Nitrox-mixtures production machine 1 in turn comprises: a molecular separator 2, which is structured so as to receive at inlet a flow of air and supply at outlet an intermediate Nitrox mixture with a high percentage of oxygen; a low-pressure compressor 3, which is adapted to feed at inlet of the molecular separator 2 a flow of air with a predetermined nominal pressure preferably higher than 3 bar and/or lower than 20 bar; and a mixing manifold 4, which communicates with the molecular separator 2 so as to receive said intermediate Nitrox mixture, and is structured so as to mix the intermediate Nitrox mixture with fresh air from the outside, in order to provide at outlet a final Nitrox mixture having a predetermined composition.

Clearly, the oxygen percentage of the final Nitrox mixture is lower than or equal to the oxygen percentage of the intermediate Nitrox mixture.

Preferably, the outlet of the mixing manifold 4 is moreover structured so as to be connected or connectable directly to the suction mouth of the high-pressure compressor 101, in order to feed said final Nitrox mixture at inlet of the same high-pressure compressor 101.

Molecular Separator 2, on the other hand, is preferably a semi-permeable membrane molecular separator.

In addition, the Nitrox-mixtures production machine 1 moreover comprises: at least one oxygen sensor 5, which is capable of measuring the percentage of oxygen present in the Nitrox mixture exiting the mixing manifold 4, i.e. the oxygen percentage present in the Nitrox mixture; and an electronic control device 6, which is connected to the oxygen sensor(s) 5, and is adapted to regulate/vary the flowrate of the air flow that the low-pressure compressor 3 feeds at inlet of the molecular separator 2, depending on the signals arriving from the oxygen sensor(s) 5.

In other words, the electronic control device 6 is adapted to regulate/vary, in a completely autonomous manner, the flowrate of the airflow that the low-pressure compressor 3 feeds at inlet of the molecular separator 2, based on signals arriving from the oxygen sensor(s) 5.

More specifically, the or at least one of the oxygen sensors 5 is preferably located at the outlet of the mixing manifold 4 or immediately downstream of the mixing manifold 4, and is structured so as to provide as output an electrical signal indicating the percentage of oxygen present in the Nitrox mixture directed towards the suction mouth of the high-pressure compressor 101.

The electronic control device 6, on the other hand, is preferably adapted to regulate the flowrate of the airflow that the low-pressure compressor 3 feeds at inlet of the molecular separator 2, in such a way as to automatically maintain at a pre-set target value the oxygen percentage in the Nitrox mixture that exits the mixing manifold 4 and advantageously enters the suction mouth of the high-pressure compressor 101. Preferably this target value is moreover manually selectable by the user within a predetermined range.

In addition, the Nitrox-mixtures production machine 1 preferably also includes a preferably electrically-powered, heating device 7, which is interposed between the low-pressure compressor 3 and the molecular separator 2, and is adapted to heat up the airflow that the low-pressure compressor 3 feeds to the molecular separator 2.

The electronic control device 6, moreover, is preferably also adapted to command the heating device 7 advantageously so as to bring and maintain the temperature of the airflow entering the molecular separator 2 to a predetermined target value.

More in detail, the Nitrox-mixtures production machine 1 is preferably provided with at least one temperature sensor 8, which is located between the molecular separator 2 and the heating device 7, and is structured so as to provide as outlet an electrical signal indicative of the temperature of the air directed towards the molecular separator 2.

The electronic control device 6, in turn, is preferably connected to the temperature sensor(s) 8, and is preferably adapted to command the heating device 7 according to the signals arriving from the temperature sensor(s) 8, so as to bring the temperature of the airflow entering the molecular separator 2 to a predetermined target value advantageously comprised between +35° C. and +45° C.

In addition, the electronic control device 6 is preferably also adapted to command the heating device 7 according to the signals arriving from the oxygen sensor(s) 5.

More specifically, the electronic control device 6 is preferably also adapted to vary/modify the target value of the air temperature at the inlet to the molecular separator 2 depending on the signals arriving from the oxygen sensor(s) 5.

Preferably, the Nitrox-mixtures production machine 1 additionally comprises at least one pressure sensor 9, which is located on the molecular separator 2 and is structured so as to provide as output an electrical signal indicative of the pressure value of the air contained within the molecular separator 2.

The electronic control device 6, in turn, is preferably also connected to the pressure sensor(s) 9, and is preferably adapted to regulate the flowrate of the air flow that the low-pressure compressor 3 feeds at inlet to the molecular separator 2 also depending on the signals arriving from the pressure sensor(s) 9.

With reference to FIG. 2, in the example shown, the semi-permeable membrane molecular separator 2 is preferably structured so as to deliver a Nitrox mixture with an oxygen percentage lower than 50% and advantageously ranging between 38% and 45%.

In addition, the molecular separator 2 preferably comprises: a pressure vessel 10 advantageously oblong in shape, which is preferably made of a metal or composite material, and is provided with an inlet and two outlets separate and distinct from each other; an automatic discharge valve 11, which is located at a first outlet of the pressure vessel 10 and is adapted to maintain the pressure of the gas inside the pressure vessel 10 more or less constant at a predetermined value advantageously lower than 20 bar; and a bundle of hollow fibres with a semi-permeable wall (not visible in the figures), which are arranged inside the pressure vessel 10 so as to connect the inlet of the vessel directly with the outlet of the vessel where the discharge valve 11 is located, and are made of a polymeric or composite material having a structure permeable to molecules of oxygen, water vapour, carbon dioxide and, more generally, to molecules with dimensions smaller than those of nitrogen molecules.

The semi-permeable membrane molecular separator 2 is a component readily available on the market, so its structure won't be further described.

The semi-permeable membrane molecular separator 2 operates as follows: while the air flow produced by the low-pressure compressor 3 enters the pressure vessel 10 and flows within the hollow fibres towards the discharge valve 11, most of the molecules of oxygen, carbon dioxide and/or water vapour contained in the air succeed in freely passing through the wall of the hollow fibres, and heads towards the second outlet of the pressure vessel 10. Instead, almost all of the nitrogen molecules contained in the air flowing within the hollow fibres remain confined within the hollow fibres and reach the first outlet of pressure vessel 10, from where they exit the pressure vessel 10 through the discharge valve 11.

From the first outlet of pressure vessel 10, therefore, a gaseous mixture is discharged into the atmosphere with a very high nitrogen percentage advantageously high than 90%.

From the second outlet of pressure vessel 10, instead, it comes out a Nitrox mixture with a high oxygen percentage, with the addition of a small percentage of water vapour and/or carbon dioxide.

More specifically, a Nitrox mixture with an oxygen percentage preferably ranging between 38% and 45% comes out of the second outlet of pressure vessel 10.

Mixing manifold 4, in turn, is preferably connected to the second outlet of pressure vessel 10 in order to receive the Nitrox mixture with the high oxygen percentage.

With particular reference to FIG. 2, the mixing manifold 4 preferably comprises: an oblong and advantageously also substantially rectilinear, tubular body 13, which is provided with an additional mouth spaced apart from the two main mouths located at the two opposite ends of the same tubular body 13; and advantageously also a series of deflecting fins or appendages 14, which are spread within the tubular body 13 and are adapted to create a strong turbulence in the gaseous mixture flowing within the tubular body 13.

The first end/mouth of the tubular body 13 communicates directly with the outside. The second end/mouth of the tubular body 13 is structured so as to be connected directly to the suction mouth of the high-pressure compressor 101, preferably by means of a removable connecting pipe 15. The additional mouth of tubular body 13, on the other hand, communicates directly with the outlet of the molecular separator 2, or rather with the second outlet of the pressure vessel 10, so as to allow the Nitrox mixture with the high oxygen percentage to freely enter inside the same tubular body 13.

Preferably, the mixing manifold 4 additionally includes a filtering assembly 16, which is located at first end/mouth of tubular body 13, and is adapted to retain the dust suspended in the air entering the tubular body 13.

With particular reference to FIG. 2, in addition, the or at least one of the oxygen sensors 5 is preferably fixed on the tubular body 13 at or near the second end/mouth of tubular body 13.

Preferably, the or each oxygen sensor 5 moreover consists of an electrochemical oxygen cell of a known type, that provides at output an electrical signal indicative of the value of the oxygen percentage present in the gaseous mixture grazing the cell.

The heating device 7, on the other hand, preferably comprises: an oblong tubular body 17, which is preferably substantially rectilinear and/or made of metallic material, and is adapted to be crossed by the airflow directed towards the molecular separator 2; and a resistor 18, which is located within the tubular body 17 so as to be lapped and cooled by the airflow passing through the same oblong tubular body 17.

Preferably, the or at least one of the temperature sensors 8 is also located/mounted on tubular body 17, at the end/mouth from where the airflow exits the tubular body 17, directed towards the molecular separator 2.

With reference to FIGS. 1 and 2, on the other hand, the low-pressure compressor 3 is preferably structured so as to suck air at ambient pressure and feed the molecular separator 2 with an airflow with a pressure advantageously ranging between 8 and 15 bar.

In addition, the low-pressure compressor 3 is preferably a rotary volumetric compressor.

More specifically, the low-pressure compressor 3 is preferably a volumetric screw compressor.

In other words, the low-pressure compressor 3 preferably comprises: a screw pumping assembly 20; an electric drive motor 21, which is mechanically connected to the screw pumping unit 15 so as to drive into rotation the two rotors of the screw pumping assembly 20, advantageously with a predetermined and substantially constant rotation speed; and preferably also a gas/liquid separator 22, which is located downstream of the screw pumping assembly 20, and is structured to retain within itself the droplets of oil and/or condensed water vapour present in the airflow coming out from the pumping assembly 20.

In addition, the low-pressure compressor 3 is preferably also provided with a filtering assembly 23, which is located upstream of the screw pumping assembly 20, and is adapted to retain the dust suspended in the air being sucked in by the low-pressure compressor 3.

Preferably, the pumping assembly 20 and the drive motor 21 are moreover arranged side by side to each other, advantageously resting on the same supporting platform or frame, so as to form an easily transportable single block. Also the gas/liquid separator 22 and/or the filtering assembly 23 is/are advantageously located on the supporting platform or frame that hosts the pumping assembly 20 and the drive motor 21.

In addition, the screw pumping assembly 20 and the drive motor 21 are preferably connected to each other by means of a drive belt, which is looped around two pulleys fixed one to the shaft of the drive motor 21 and the other to the shaft of the screw pumping assembly 20.

Clearly, the drive motor 21 may drive into rotation the shaft of pumping assembly 20 without the use of belts and/or other intermediate motion transmission parts.

Preferably also the molecular separator 2 and/or the mixing manifold 4 and/or the electronic control device 6 and/or the heating device 7 is/are located on the supporting platform or frame that hosts the pumping assembly 20 and the drive motor 21.

With particular reference to FIG. 2, the electronic control device 6, in turn, is preferably adapted to regulate/adjust the flowrate of the airflow that is sucked in by the low-pressure compressor 3, or rather by the screw pumping assembly 20, based on the signals coming from the oxygen sensor(s) 5 and advantageously also based on the signals coming from the pressure sensor(s) 9.

More in detail, the electronic control device 6 preferably comprises an electronically-controlled valve assembly 24, which is located upstream of the suction of the low-pressure compressor 3, or rather upstream of the suction mouth of the screw pumping assembly 20, and is adapted to regulate the flowrate of the airflow that is sucked in by the low-pressure compressor 3.

In addition, the electronic control device 6 preferably also comprises an electronic control unit 25, which is connected to the oxygen sensor(s) 5 and advantageously also to the pressure sensor(s) 9, and is adapted to command the electronically-controlled valve assembly 24 based on the signals arriving from the oxygen sensor(s) 5 and advantageously also based on the signals arriving from the pressure sensor(s) 9.

In the example shown, in particular, the valve assembly 24 preferably comprises: a control valve 26, which is located upstream of the suction of low-pressure compressor 3, or rather upstream of the suction mouth of the screw pumping assembly 20, and has a movable shutter body that determines, by its position, the flowrate of air passing through the valve; and an electronically-controlled driving device 27, which is adapted to move/shift the shutter body of the control valve 26 so as to vary the flowrate of the airflow sucked by the low-pressure compressor 3, or rather by the screw pumping assembly 20, advantageously between a maximum and a minimum value.

The electronic control unit 25, in turn, is preferably adapted to command driving device 27 based on the signals arriving from the oxygen sensor(s) 5.

More in detail, the electronic control unit 25 is preferably programmed/configured so as to maintain the oxygen percentage in the Nitrox mixture flowing out of the mixing manifold 4, or rather flowing out of the second end/mouth of tubular body 13, substantially constant over time and substantially equal to said pre-set target value.

In the example shown, in particular, the control valve 26 is preferably a butterfly or gate valve, and is preferably interposed between the filtering assembly 23 and the suction mouth of the screw pumping assembly 20.

The driving device 27, on the other hand, preferably includes an electric actuator 28, which is advantageously attached directly to the control valve 26, and is capable of moving/shifting, on command, the shutter body of the control valve 26, so as to vary the flowrate of the airflow sucked in by the low-pressure compressor 3, or rather by the screw pumping assembly 20, advantageously between zero and a predetermined maximum value.

Clearly, the electronic control unit 25 is adapted to command the electric actuator 28.

With reference to FIG. 2, the electronic control device 6 is moreover provided with an external control panel, or other type of user interface, via which the user can communicate to the electronic control unit 25 the oxygen percentage of the Nitrox mixture that has to come out from the mixing manifold 4 and, consequently, reach the suction of the high-pressure compressor 101; and optionally also of a display or other external visualising device, which is commanded by the electronic control unit 25 and is capable of displaying the oxygen percentage momentarily set as the target value by the user.

Preferably, said visualising device is moreover capable of displaying, advantageously in real time, the value detected by the oxygen sensor(s) 5 and/or the value detected by the pressure sensor(s) 9.

In the example shown, in particular, the electronic control unit 25 and/or the control panel and/or the visualising device are advantageously located within a rigid boxlike enclosure of known type.

Preferably, the electronic control unit 25 is moreover connected also to the temperature sensor(s) 8, and is advantageously also adapted to command the heating device 7 based on the signals arriving from the temperature sensor(s) 8 and optionally also based on the signals arriving from the oxygen sensor(s) 5.

More in detail, the electronic control unit 25 is preferably programmed/configured so as to independently establishes the target temperature that the airflow entering the molecular separator 2 must have, advantageously choosing it among a predetermined range of values, and then it is adapted to activate and deactivate the heating device 7 so as to heat the airflow directed towards the molecular separator 2 up to this target value.

In other words, the electronic control unit 25 is preferably programmed/configured to command the electric current circulating in the resistor 18 of heating device 7.

Preferably, said visualising device is moreover capable of displaying, advantageously in real time, the value measured by said temperature sensor(s) 8.

In a less sophisticated embodiment, however, the electronic control unit 25 may be programmed/configured to activate and deactivate the heating device 7 in order to heat the airflow headed towards the molecular separator 2 up to a preset, non-adjustable target value, advantageously ranging between +35° C. and +45° C.

Preferably, the electronic control unit 25 of the electronic control device 6 is finally also adapted to open the discharge valve 112 if the composition of the Nitrox mixture coming out of mixing manifold 4 does not correspond to the set composition.

With reference to FIGS. 1 and 2, preferably the Nitrox-mixtures production machine 1 additionally comprises, upstream of the molecular separator 2 or the heating device 7, a drying device 29 and/or a filtering assembly 30.

The drying device 29 is adapted to retain at least part of the water vapour present in the airflow coming out of the low-pressure compressor 3, or rather coming out of the screw pumping assembly 20, and is preferably located immediately downstream of the gas/liquid separator 22 or the screw pumping assembly 20.

In the example shown, the drying device 29 is preferably an absorption dryer structured to reduce the amount of water vapour in the air leaving the low-pressure compressor 3 to a value less than or equal to 15 $mg/m^3$.

The filtering assembly 30, on the other hand, is preferably located between the drying device 29 and the molecular separator 2 or the heating device 7, and is structured so as to retain impurities and other physical and/or biological contaminants present in the airflow directed towards the molecular separator 2.

In the example shown, the filtering assembly 30 is preferably made up of a series of activated carbon filters arranged in cascade one to the other.

Preferably also the drying device 29 and/or the filtering assembly 30 is/are located on the supporting platform or frame that hosts the pumping assembly 20 and the drive motor 21, so as to form an easily transportable single block.

General operation of the scuba-diving cylinders refilling equipment 100 and of its high-pressure compressor 101 are already known in the market and therefore need no further explanations.

On the other hand, with regard to the Nitrox-mixtures production machine 1, the electronic control unit 25 of the electronic control device 6 is programmed/configured so as to implement a feedback control of the valve assembly 24, or rather of the driving device 27, based on the signals arriving from the oxygen sensor(s) 5.

More in detail, the electronic control unit 25 is programmed/configured to continuously modify/adjust the position of the movable shutter of control valve 26 based on the signals from the oxygen sensor(s) 5, so as to bring and maintain the oxygen percentage of the Nitrox mixture coming out of mixing manifold 4 to a value substantially equal to the target percentage set by the user.

By varying the flowrate of the airflow entering the low-pressure compressor 3, in fact, the electronic control unit 25 also varies the flowrate of the airflow entering the molecular separator 2 and, consequently, the flowrate of the flow of intermediate Nitrox mixture entering the mixing manifold 4. Each change in the flowrate of the Nitrox mixture entering into the mixing manifold 4, in turn, results in a change of the oxygen percentage of the Nitrox mixture sucked in by the high-pressure compressor 101.

In addition, experimental tests have shown that the efficiency of the molecular separator 2, or rather the value of the oxygen percentage of the Nitrox mixture leaving the molecular separator 2, depends in part also on the temperature of the airflow entering into the molecular separator 2.

By also controlling the heating device 7, or rather by being able to also vary the temperature of the airflow entering into the molecular separator 2, the electronic control device 6 is moreover able to regulate/control the oxygen percentage of the intermediate Nitrox mixture leaving the molecular separator 2 and entering the mixing manifold 4.

The advantages connected to the use of the Nitrox-mixtures production machine 1 are remarkable.

The Nitrox-mixtures production machine 1 does not require continuous supervision by the user and, in addition, is also capable of discharging externally the produced Nitrox mixture if its composition does not correspond to that set by the user.

The electronic control device 6 moreover implements an additional feedback control based on the temperature of the airflow entering molecular separator 2.

Experimental tests have also shown that the electronic control unit 25, due to its response speed, is also capable to reduce the duration of the transient state operations, thus significantly reducing the amount of Nitrox mixture that must be discharged externally because its composition does not match that set by the user.

In addition, the electronic control unit 25 may be programmed to adopt, at start-up and/or during other transient states, containment strategies designed to reduce fluctuations in the oxygen percentage of the Nitrox mixture coming out of the Nitrox-mixtures production machine 1, so as to compensate for such fluctuations directly within the cylinder(s) 200 currently connected to the scuba-diving cylinder refilling equipment 100.

Finally, it is clear that modifications and variations may be made to the Nitrox-mixtures production machine 1 and/or the scuba diving cylinder refilling equipment 100 without however departing from the scope of the present invention.

For example, the low-pressure compressor 3 may be a lobe-type volumetric compressor.

In addition, the automatic discharge valve 11 of molecular separator 2 may be replaced by a simple pressure reducer and/or flow reducer.

Figure 3:
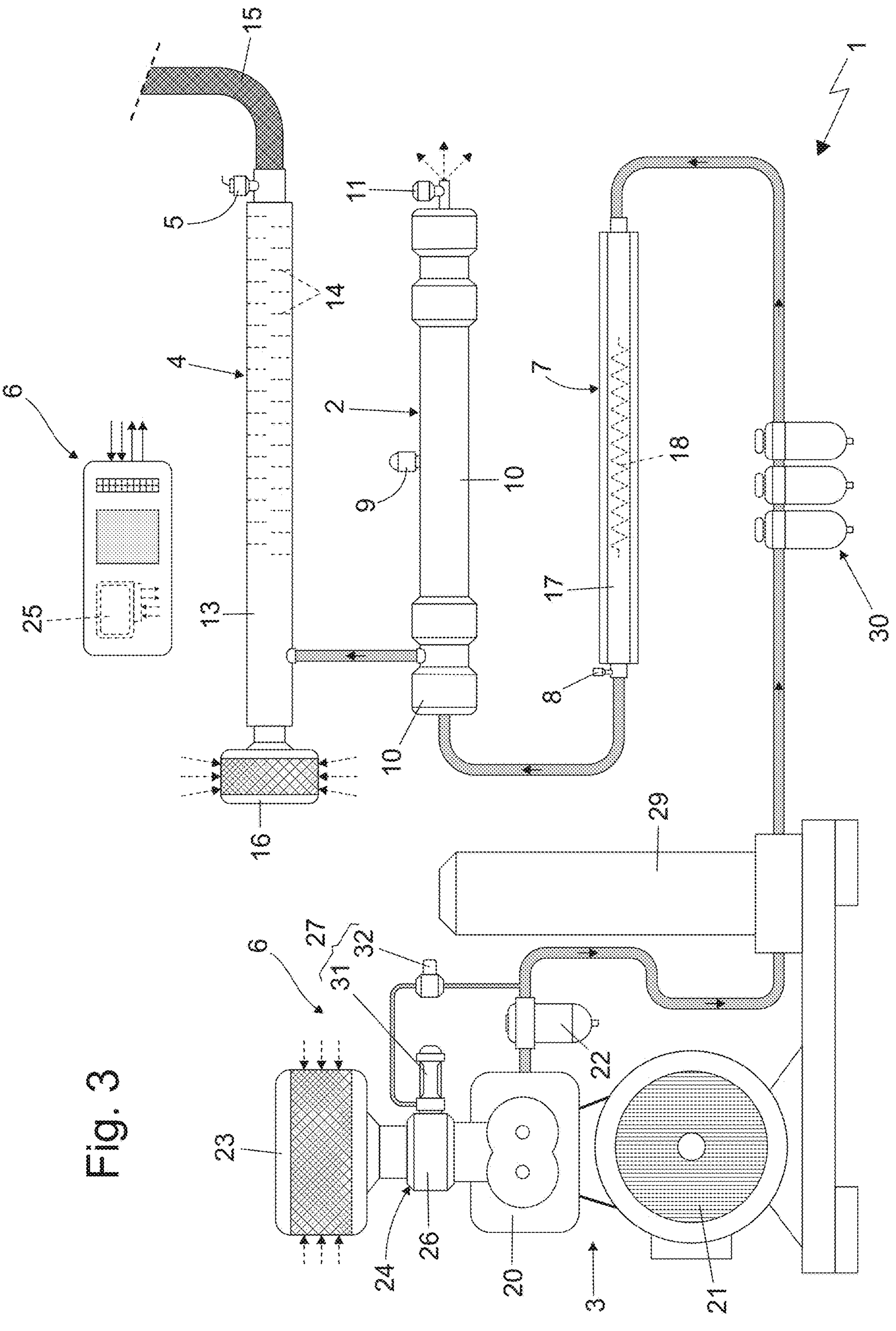
FIG. 3 is a schematic view of a different embodiment of Nitrox-mixtures production machine shown in FIG. 2.

With reference to FIG. 3, moreover, in a less sophisticated embodiment of the electronic control device 6, the electronically-controlled driving device 27 comprises, in place of the electric actuator 28, a pneumatic actuator 31 advantageously attached directly to the control valve 26, which is capable of moving/shifting the shutter body of the control valve 26 based on the pressure value of the air received at its inlet, and is preferably supplied with pressurised air arriving from a pressurised-air source.

More in detail, the pneumatic actuator 31 is preferably supplied with pressurised air coming out from the low-pressure compressor 3.

In this embodiment, in addition, the driving device 27 further comprises an electrically-actuated pressure reducer 32, which is located upstream of the pneumatic actuator 31 so as to be crossed by pressurised air arriving from the low-pressure compressor 3 or other pressurised-air source, and is capable of controlling the value of the air pressure reaching the pneumatic actuator 31.

The electronic control unit 25, in turn, is adapted to command the pressure reducer 32.

More in detail, the pressure reducer 32 is adapted to lower the pressure of the air reaching the pneumatic actuator 31 to a freely-adjustable target value which is controlled by the electronic control unit 25.

In other words, in this embodiment, the electronic control unit 25 is adapted to vary the value of the pressure of the air reaching the pneumatic actuator 32, clearly always based on the signals arriving from the oxygen sensor(s) 5.

Finally, in a more sophisticated embodiment, the electronic control device 6 can regulate/adjust the flowrate of the airflow that the low-pressure compressor 3 feeds at the inlet of the molecular separator 2 also by appropriately varying the rotation speed of the pumping assembly 20.

In other words, the electric motor 21 is capable of driving the pumping assembly 20 into rotation with a variable velocity, and the electronic control device 6, or rather the electronic control unit 25, is capable of adjusting/varying the rotation speed of the electric motor 21 based on the signals arriving from the oxygen sensor(s) 5.

More specifically, the electronic control device 6 may comprise, in addition to or as an alternative to the electronically-controlled valve assembly 24, an inverter or similar converter, which powers the electric motor 21 and is capable of varying, on command, the motor rotation speed.

The electronic control unit 25, in turn, is adapted to command the inverter according to signals arriving from the oxygen sensor(s) 5.

The invention claimed is:

1. A Nitrox mixtures production machine comprising:

a molecular separator having an inlet configured to receive a flow of air and an outlet configured to provide an intermediate Nitrox mixture with high oxygen percentage;

a low pressure compressor configured to feed an air flow at the inlet;

a mixing manifold which communicates with the molecular separator so as to receive said intermediate Nitrox mixture, and is configured to mix the intermediate Nitrox mixture with ambient air, in order to provide at an outlet of the mixing manifold a final Nitrox mixture with predefined composition; and at least one oxygen sensor configured to measure the oxygen percentage present in said final Nitrox mixture; and an electronic control device connected to said at least one oxygen sensor and configured to regulate a flow rate of the air that the low pressure compressor feeds at the inlet based on the signals coming from said at least one oxygen sensor;

wherein said electronic control device is configured to regulate a flow rate of the air sucked in by the low pressure compressor and comprises:

an electronically controlled valve assembly located upstream of a suction of the low pressure compressor and configured to regulate the flow rate of the air sucked in by the low pressure compressor; and an electronic control unit connected to said at least one oxygen sensor and configured to command the electronically controlled valve assembly according to the signals coming from said at least one oxygen sensor;

wherein said valve assembly comprises:

a control valve located upstream of the suction of the low-pressure compressor; and an electronically-controlled driving device configured to move a shutter of said control valve in order to vary the flow rate of the air sucked in by the low-pressure compressor;

wherein the electronic control unit is configured to command said driving device.

2. The Nitrox mixtures production machine according to claim 1, wherein said mixing manifold is configured to be connected directly to a suction of a high pressure compressor for feeding said final Nitrox mixture at an inlet of the high pressure compressor.

3. The Nitrox mixtures production machine according to claim 1, wherein said electronic control device is configured to regulate the flow rate of the air that the low pressure compressor feeds the inlet-, so as to maintain the oxygen percentage of said final Nitrox mix at a predefined and user selectable target value.

4. The Nitrox mixtures production machine according to claim 1, wherein the low pressure compressor is a volumetric compressor.

5. The Nitrox mixtures production machine according to claim 1, wherein the electronically controlled driving device comprises an electric actuator configured to move the shutter of the control valve and is controlled by said electronic control unit.

6. The Nitrox mixtures production machine according to claim 1, wherein the electronically controlled driving device comprises:

a pneumatic actuator configured to move the shutter of the control valve and is supplied with pressurized air coming from a pressurized air source; and an electrically operated pressure reducer which controls the pressure of the air that reaches the pneumatic actuator and is commanded by said electronic control unit.

7. The Nitrox mixtures production machine according to claim 1, wherein said machine comprises a heating device interposed between the low pressure compressor and the molecular separator, and configured to heat up the air flow that the low pressure compressor feeds to said molecular separator.

8. The Nitrox mixtures production machine according to claim 7, wherein said electronic control device is configured to control the heating device so as to bring and maintain the temperature of the air flowing into the molecular separator at a predefined target value.

9. The Nitrox mixtures production machine according to claim 1, wherein said molecular separator is a semi permeable membrane molecular separator.

10. The Nitrox mixtures production machine according to claim 1, wherein the low pressure compressor is a volumetric compressor with screw pumping assembly.

11. The Nitrox mixtures production machine according to claim 1, wherein the low pressure compressor comprises a pumping assembly and an electric motor configured to drive into rotation said pumping assembly at a variable speed;

the electronic control device comprising an electronic control unit which controls the rotation speed of said electric motor and is configured to vary said rotation speed based on the signals coming from said at least one oxygen sensor.

12. The Nitrox mixtures production machine according to claim 1, wherein said machine moreover comprises at least one pressure sensor-, configured to measure the air pressure inside the molecular separator;

the electronic control device being also connected to said at least one pressure sensor, and being configured to regulate the flow rate of the air flow that the low pressure compressor feeds at the inlet also based on the signals coming from said at least one pressure sensor.

13. A scuba diving cylinders refilling equipment comprising:

a high pressure compressor configured for sucking in air or another gaseous mixture at ambient pressure and for providing at an outlet a flow of high pressure air or other gaseous mixture to be supplied at an inlet of one or more scuba diving cylinders; and a Nitrox mixtures production machine located upstream of said high pressure compressor and is configured to feed a Nitrox mixture with predefined composition at an inlet of said high pressure compressor;

wherein said Nitrox mixtures production machine is realized according to claim 1.

* * * * *